April 27, 1937. F. C. BIGGERT, JR., ET AL 2,078,365
MEANS AND METHOD FOR MAKING STRIP
Filed Aug. 6, 1935 4 Sheets-Sheet 2
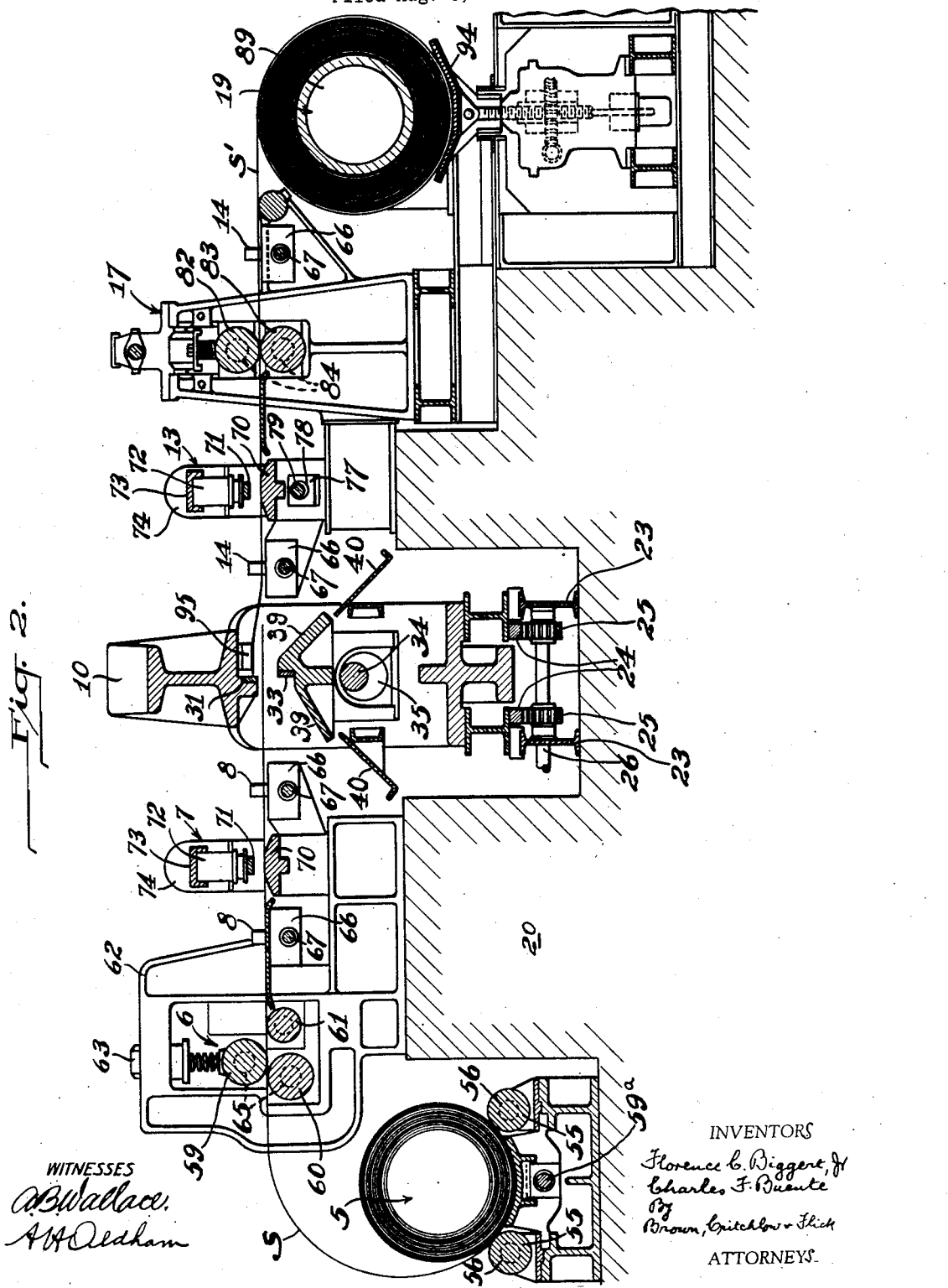

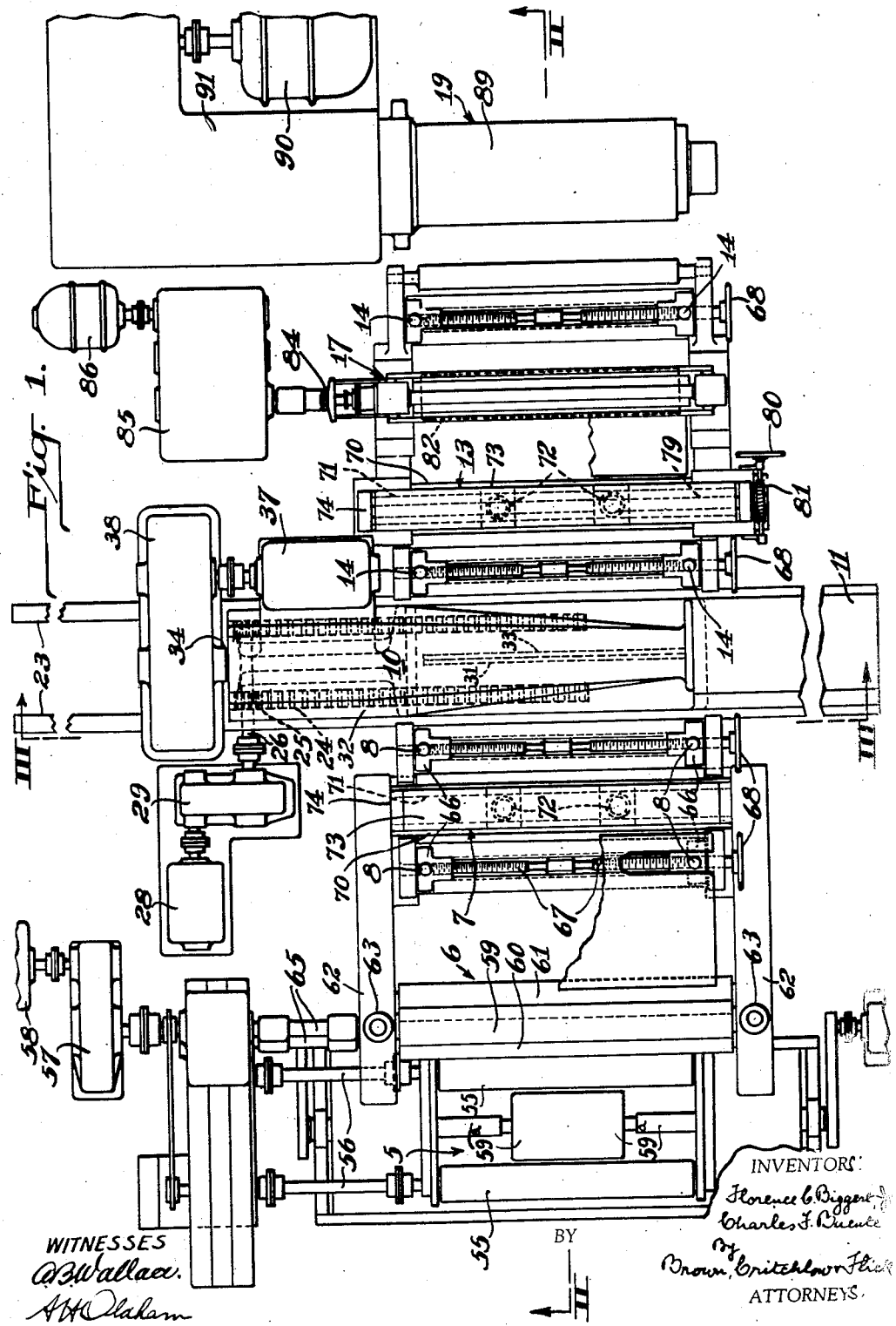

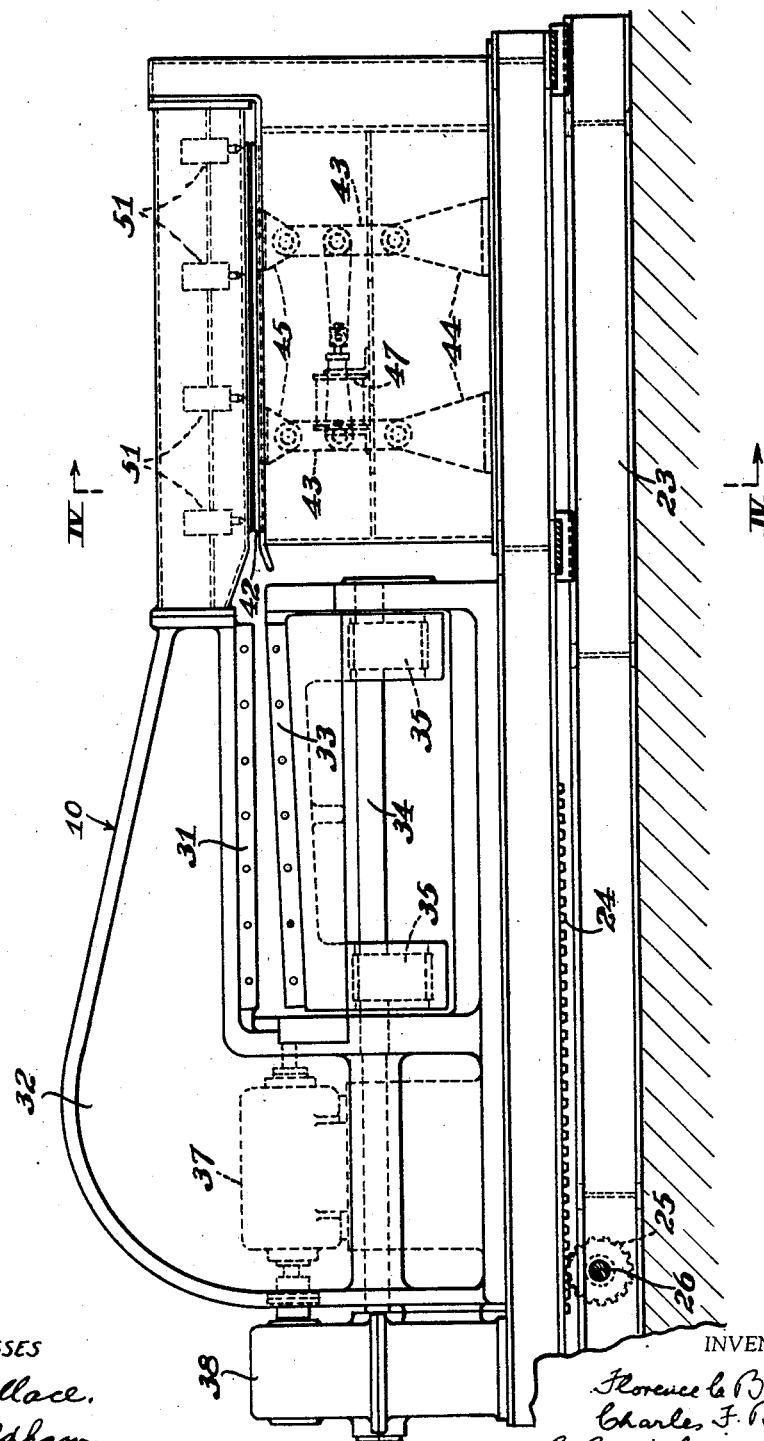

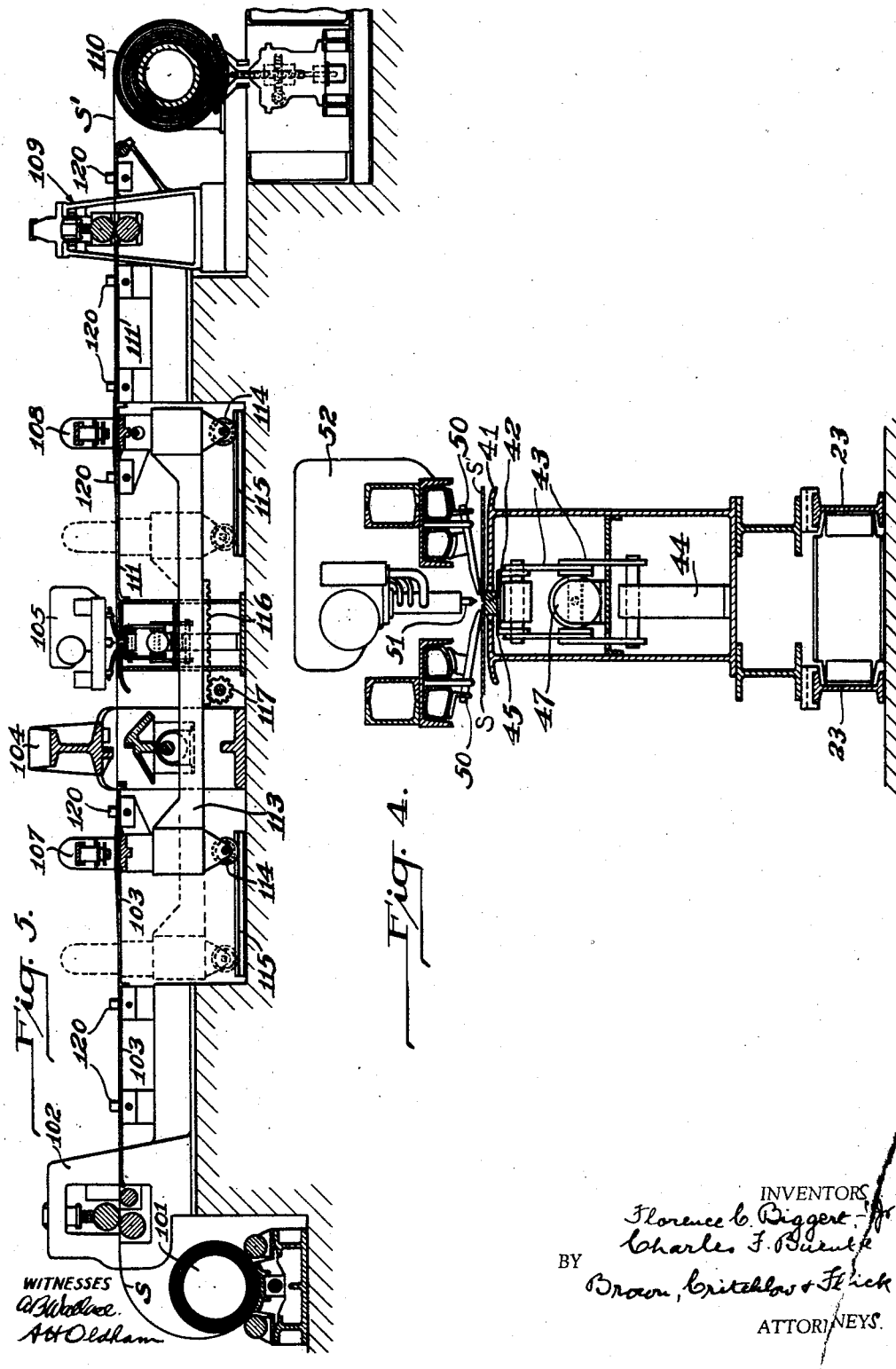

Patented Apr. 27, 1937

2,078,365

UNITED STATES PATENT OFFICE 2,078,365

MEANS AND METHOD FOR MAKING STRIP

Florence C. Biggert, Jr., Crafton, and Charles F. Buente, Pittsburgh, Pa., assignors to United Engineering & Foundry Company Pittsburgh, Pa., a corporation of Pennsylvania Application August 6, 1935, Serial No. 34,912

21 Claims. (Cl. 113—1)

This invention relates to the manufacture of metal strip, and more particularly is concerned with improved processes and apparatus for welding strip end to end to form a continuous length.

Coryell Patent No. 1,940,939 broadly discloses and claims the method of welding metal strip end to end with associated cold-rolling operations. Making the strip continuous eliminates roll marks caused by the fish-tail ends of an ordinary short strip passing through the mills, increases production and improves the general efficiency of the strip mills. The present invention comprises an improvement upon the Coryell method, and more particularly provides apparatus for commercially welding strip end to end.

Heretofore, in joining relatively long metal strip portions together, difficulty has been experienced in properly aligning the strip portions with each other during the shearing of the crop ends and the welding of the strips together. Another source of trouble has been that the crop ends were not cut in the same manner from the strip portions so that the abutting edges of the strip portions prior to being welded were apt to be dissimilar across their width. Again difficulty has arisen due to the fact that the strip must ordinarily be clamped after aligning with the shear for the shearing operation, and the strip must again be clamped for the welding operation. This has necessitated considerable time by prior known methods and machines, and positive alignment of the strip portions and an effective weld have not readily been accomplished.

It is an object of the present invention to avoid and overcome the foregoing and other difficulties attending the manufacture of continuous metal strip by the provision of improved means and methods for rapidly and effectively welding together metal strip portions in a commercially practical manner.

Another object of the invention is to provide apparatus for welding together metal strip to form a continuous strip with the apparatus aligning and clamping the strip prior to a subsequent shearing of the crop ends and a final welding of the strip together, with the apparatus operating without releasing the clamps between the shearing and welding steps.

Another object of the invention is to provide a method of welding together metal strip in end-to-end relation with the strip being positively aligned and effectively welded while requiring a minimum of time and labor.

The foregoing and other objects of the invention are achieved by the practice of our method wherein the ends of two strips are aligned with each other with the strip being clamped in the aligned position. The crop ends of the strips are cut off with identical cuts so that the ends of the main portions of the strips are in relation for welding. The strip ends are then welded with a butt joint to form a continuous strip and then for the first time the strip is unclamped and is passed to the rolling mill or, preferably, is coiled prior to further operations thereon.

Apparatus embodying the features of the invention includes means for aligning with each other or with the same element the strip portions to be welded together with associated means for clamping the strip portions in aligned position. A single shear is employed for severing the crop ends of both strip portions so that the cuts thereon are identical, and welding means are so associated with the apparatus that the strip ends can be welded together without releasing the clamping means. The clamps holding the strip ends prior to and during welding may be made adjustable toward and from each other so that the exact distance between the ends of the strip portions can be adjusted to best adapt the abutting faces for the desired welding operation. Strip-coiling means are likewise provided on the apparatus for coiling the strip after welding. The apparatus can also be used to weld a plurality of additional strips onto the continuous strip and this is an important advantage of the apparatus herein disclosed and claimed.

Referring to the drawings wherein several embodiment of the invention are illustrated, Fig. 1 is a plan view of one form of the invention; Fig. 2 is a vertical longitudinal cross-sectional view taken on line II—II of Fig. 1; Fig. 3 is a transverse vertical sectional view taken on line III—III of Fig. 1 and illustrating the details of the shear and welding means associated with the apparatus; Fig. 4 is a vertical sectional view taken on line IV—IV of Fig. 3 and showing the construction of the welding mechanism; and Fig. 5 is a vertical longitudinal cross-sectional view similar to Fig. 2, but of a modification of the invention.

While the invention contemplates welding strips end to end regardless of the particular way the strip is handled before and after the welding operation as, for example, by prior or subsequent rolling operations, the strip is preferably coiled in accordance with the usual practice to facilitate its handling and accordingly the invention is illustrated as being adapted to handle coiled strip.

In the drawings, particularly Figs. 1 to 4, the apparatus is illustrated as comprising a strip uncoiler 5, flattening rolls 6, clamps 7, aligning rollers 8, a shear 10, a welder 11, clamps 13, aligning rollers 14, a pinch roll stand 17 and a strip coiler 19, all carried upon suitable foundations indicated generally at 20.

The shear 10 and welder 11 are laterally connected end to end, as best seen in Figs. 1 to 3, and are slidably supported upon I-beams 23 carried by the foundation 20. Means are provided for controlling the lateral position of the shear and welder, and in the particular embodiment of the invention illustrated these comprise racks 24 secured to the bottom of the shear 10 with pinions 25 engaging with the racks and carried upon a shaft 26 connected to a suitable motor 28 through a gear box 29.

The shear 10 is of any known type, but preferably is of the bottom blade actuated type, as shown in Figs. 2 and 3, wherein an upper blade 31 is carried by a C-frame 32 with a bottom blade 33 being carried by a shaft 34. The shaft 34 mounts eccentrics 35 which are received in suitable bearings in the blade support. The shaft 34 is operated by a motor 37 through a gear box 38.

The support for the lower shear blade 33 is formed with inclined side portions 39 which permit the sheared crop ends of the strips to slide down from the blade to gutters 40 and from there to suitable receptacles in accordance with known practice.

The welding mechanism 11 associated with the shear 10, as best seen in Figs. 3 and 4, includes a vertically fixed platform 41 having an opening therein through which projects a bar electrode 42 which is adapted to be moved to a retracted vertical position from its normal welding position. To this end the bar 42 is carried by a toggle linkage 43 connected at its ends to brackets 44 and 45 secured, respectively, upon the base of the welder and to the block. The position of the toggle linkage 43 is controlled by an air cylinder 47 so that the block can be moved to a lower or retracted vertical position or to the welding position as shown in the drawings. This permits the ready movement of the welder to and from position about the aligned strips as hereafter more fully explained.

The particular means for welding the strip ends together as well as the exact type of welding employed can be widely varied. However, in the form of the invention illustrated, these means include clamps 50 adapted to clamp on the end of the strips to be welded with a plurality of arc welding electrodes 51 being provided at laterally spaced portions on the welder with means, shown generally at 52, for moving the electrodes along the seam to be welded whereby a proper weld is effected.

Associated with the shear and welding unit are means for delivering the strip in aligned relation to the shear, and these means comprise the uncoiler 5 of any known type which functions to receive the coiled strip S. In the particular form of the invention illustrated this reel includes supporting rollers 55 driven by shafts 56 secured through a gear box 57 to a motor 58. Saddle 59a may be provided to further assist in centering and supporting the coil of strip S.

From the uncoiler 5 the strip S passes to the flattening rolls, shown generally at 6, which for example may comprise three rolls 59, 60 and 61 journalled in a frame 62 with adjustable means 63 being employed to determine the position of the roll 59 whereby the particular flattening action can be controlled. The rolls 59 and 60 are preferably driven as by shafts 65 through the gear box 57 and motor 58.

From the flattening rolls 6 the strip S passes between the aligning rolls 8 which are rotatable about vertical axes and which are carried in blocks 66 threaded on the ends of opposite handscrews 67. The opposite handscrews 67 can be adjusted by hand-wheels 68, or power means can be employed if desired to effect this adjustment. In this manner the lateral spacing between the aligning rollers 8 can be adjusted to adapt the apparatus to align strip of any width with the shear and with each other.

The clamping mechanism indicated generally by the numeral 7 includes a bed-plate 70 carried by the same frame 62 as supports the flattening rolls 6. Positioned above the clamping bed 70 is a transversely extending jaw 71 whose vertical position is controlled by air motors 72 secured to a spanner beam 73 mounted on end plates 74 supported by the clamping beds 70. Various clamping means can, of course, be employed since the particular purpose of the clamps is merely to prevent the strip from getting out of alignment. Thus the clamps may be in the nature of air motors which engage with the sides of the strip only.

On the other side of the shear and welder, aligning rollers 14 of similar construction to those heretofore described are employed which align the strip S' with the shear and welder. The clamping mechanism 13 is similar to the clamping mechanism 7 with the exception that the mechanism 13 is adapted to have relatively small adjustment towards and from the shear and welder 10 and 11. This is achieved in the embodiment of the invention illustrated by providing the clamping mechanism with bearing blocks 77 which surround eccentrics 78 carried by a shaft 79. The shaft may be rotated by a hand-wheel 80 through worm-gear mechanism 81 to provide for slight adjustment of the clamping means 13 towards and from the shear and welder. This adjustment is sometimes important, as hereafter described, in order to provide the desired clearance between the ends of the strip to be welded.

The pinch roll stand 17 is adapted to move the welded strip through the apparatus in either direction before or after welding and it includes rolls 82 and 83 which are driven by shafts 84 extending through a gear box 85 to a motor 86.

The coiler 19 for receiving the welded-together lengths of strip can be of any known or preferred design, but in the embodiment of the invention illustrated includes a collapsible drum 89 driven by a motor 90 through a gear box 91. A bottom cradle 94 may be provided below the reel 19 to receive the coiled strip in accordance with standard practice.

In the operation of the apparatus just described, assuming the coils of strip S and S' are to be joined together, the strip S' is fed through the entire mechanism until the tail-end of the strip extends back through the shear the desired distance so that the crop end will be severed from the main portion of the strip when the shear is operated. Prior to the shearing operation the vertical rollers 14 forming the aligning means are moved inwardly by the operation of the hand-wheels 68 to properly align the strip S' with the shear 10. When the strip is in the desired alignment, clamping means 13 is operated to clamp the strip securely in the desired position. The shear is now operated to sever the crop end from the strip S' and the crop end falls into the gutter 40 and is removed. It will be seen from Fig. 2 that in the shearing operation the end of the main portion of the strip S' is pushed up against the upper blade 31 of the shear so that it is held in wedged relation against the blade. In this position the strip S' is out of the way and permits a shearing of the crop end of the strip S as hereafter described. If, for any reason, the strip S' will not stay in the wedged position illustrated in the drawings, a magnet 95 may be associated with the upper shear blade for this purpose.

The end of the strip S is now fed in through the flattening rolls 6, the clamp 7 and the shear 10 so that its crop end extends through the shear the desired distance. The aligning rollers 8 are operated by the hand-wheels 68 to bring the strip S into alignment with the shear 10 and thus with the strip S'. Clamp 7 is now energized to secure the strip S in position and the shear is operated to cut the crop end of the strip S on exactly the same cut as the one made on the strip S'. The crop end, of course, falls into the gutter 40 and is removed. The sheared ends of the strips S and S' are now in substantially end to end contact and are ready for welding.

The entire shear 10 and welder 11 are now moved laterally through agency of the racks 24, pinions 25 and motor 28 to carry the shear 10 out of the way and to bring the welder 11 over the butt joint between the strips. In moving the welder 11 over the ends of the strips to be welded the bar 42 of the welder should be at its lower position which thereby permits the lateral retraction of the shear and the positioning of the welder as desired without interference with the strip ends. Once the welder is over the strips the air cylinder 47 is operated to move the bar 42 to its uppermost or welding position.

If desired, the particular distance between the butt faces of the strip edges to be welded can be adjusted by operation of the hand-wheel 80 which moves the clamping means 13 and the strip S' towards or from the welder 11.

The clamps 50 of the welding head are now brought into position to bear on either side of the seam to be welded and the welding apparatus is started to effect a true even weld of the aligned strips which is facilitated by the identical cuts on the strip edges and the adjustable spacing therebetween.

Once the weld has been made the reel 19 is driven by the motor 90 to coil the continuous strip material until the crop end of the strip S reaches the shear 10 as did the crop end of the strip S'. Another coil of strip is then put on the uncoiler 5 and the operation is repeated as heretofore explained. In this manner any number of lengths of strip can be rapidly welded together end to end in excellent alignment.

Although not preferred, the invention contemplates simultaneously shearing both crop ends of the strip, in which case the identical cuts are not made subsequent to each other as above set forth, but are made simultaneously with both crop ends extending through the shear at the same time. The remainder of the welding operation is as described above.

The basic features of the modification of the invention illustrated in Fig. 5 are similar to those above described in conjunction with the form of the invention shown in Figs. 1 to 4 with the exception that in Fig. 5 the shear and the welder are placed in longitudinal alignment rather than in lateral alignment. More particularly, in Fig. 5 the numeral 101 indicates a reel uncoiler of known character adapted to support strip S for passage through a flattening roll stand shown generally at 102. Associated with the roll stand 102 is a bed 103 formed of bars extending to a shear 104 and a welder 105. Clamping mechanisms 107 and 108 are provided at opposite longitudinal sides of the shear 104 and welder 105. A roll stand 109 is spaced between the clamp 108 and a coiler 110 for strip S', and a bed 111 formed of bars extends between the roll stand 109 and the welder 105.

The construction of the clamping means 107 and 108 of this embodiment of the invention is quite distinct from that shown in Figures 1 to 4 and described above. More particularly, these means include a carriage 113 supported by wheels 114 upon rails 115. The carriage 113 is adapted to be moved from its full-line to its dotted-line position or vice versa, and for this purpose it is provided with a rack 116 which engages with a pinion 117 operated by suitable means. Thus the clamps can be moved as a unit longitudinally of the apparatus after the crop-end shearing operation to bring the strip ends in spaced relation into position under the welding apparatus.

The clamp mechanisms 107 and 108 are slotted to slidably receive the bars forming the beds 103 and 111 between the clamps and the shear and welder. The upper surfaces of the bars of the beds 103 and 111 are below the clamping surfaces proper so as not to interfere with the clamping of the strips. Alignment means 120 of substantially the same character as employed in the form of the invention illustrated in Figures 1 and 4 are also provided to properly align the strips S and S' with each other.

The operation of the embodiment of the invention shown in Fig. 5 is quite similar to that described in detail above in conjunction with the mechanism of Figs. 1 to 4. The essential difference is that in the apparatus of Fig. 5 after the shearing of the crop ends of the strips, either in turn or simultaneously, the clamp frame 113 is moved from the dotted to the full-line position shown by operation of the pinion 117 against the rack 116 to bring the aligned clamped ends over the welding unit. The strips S and S' are now welded end to end and the clamps released and returned to the dotted-line position. The strip is then coiled at 110 and other strips may then be added to the continuous strip as will be understood.

In moving the clamps 107 and 108 and their connecting frame 113 from the dotted to the full-line position, the flattening rolls 102, the roll stand 109 and the coilers 101 and 110 are preferably operated. However, instead of moving the clamps and connecting frame by the rack 116 and pinion 117, they may be eliminated with the strips and their associated clamps and frame being moved by the coiler 110 and roll stand 109.

From the foregoing it will be evident that we have provided improved methods and apparatus for welding strip end to end in properly aligned relation with the abutting faces of the weld identical. The strips are clamped in alignment before shearing with the clamps only being released after welding whereby a rapid yet effective weld of aligned strip is obtained. The mechanism and its associated processes adapt themselves to the commercial efficient manufacture of cold metal strip and require a minimum number of operators. Upon subsequent rolling of the continuous strip roll markings due to the fishtail or crop ends of the strip are substantially eliminated and the speed and efficiency of cold strip mills is greatly improved.

The expressions "crop", "crop end" and "crop ends" as employed in the specification and claims, are intended to cover any end portion cut from the strip to prepare the strip end for welding.

The word "continuous" as employed in the specification and claims and as accepted by the man skilled in the art is intended to define a length of strip made up of two or more pieces joined together end to end, and ordinarily is not intended to define an endless band of strip.

While in accordance with the patent statutes several forms of the invention and several ways of practicing the method characterizing the invention have been illustrated and described, it should be understood that the invention is not limited thereto or thereby but is defined in the appended claims.

We claim:

1. That method of making rolled metal strip which comprises aligning the ends of two strips with each other, clamping the strip ends in the aligned position, cutting off the crop ends of the strips so that the ends of the remaining main portions of the strips are in relation for welding, welding the ends of the strips together while still clamped to form a continuous strip, and unclamping the strip.

2. That method of making metal strip which comprises aligning the ends of two strips with each other, clamping the strip ends in the aligned position, cutting off the crop ends of the strips with the same cut on each strip end and so that the ends of the remaining main portions of the strips are in relation and have identically cut edges for welding, adjusting the clearance between the ends of the strip, butt-welding the ends of the strips together while still clamped to form a continuous strip, and unclamping the strip.

3. That method of making metal strip which comprises aligning the ends of two strips with each other, clamping the strip ends in the aligned position, cutting off the crop ends of the strips with the same cut on each strip end, welding the ends of the strips together without unclamping to form a continuous strip, and unclamping the strip.

4. The process of making continuous metal strip which comprises aligning a strip end with a shear with the crop end of the strip extending through the shear, clamping the strip in the aligned position, shearing off the crop end of the strip, holding the remaining portion of the strip out of position but still clamped, aligning a second strip with the other side of the shear with the crop end extending through the shear, clamping the second strip, shearing the crop end of the second strip, adjusting the distance between the clamped ends of the strips, moving the strips while in clamped position relative to the shear to position the ends for welding, welding the strip ends together, unclamping the strips, and coiling the continuous strip.

5. The process of making continuous metal strip which comprises aligning a strip end with a shear with the crop end of the strip extending through the shear, clamping the strip in the aligned position, shearing off the crop end of the strip, aligning a second strip with the other side of the shear with the crop end extending through the shear, clamping the second strip, shearing the crop end of the second strip, adjusting the distance between the clamped ends of the strips, effecting relative movement between the strips while in clamped position and the shear, and welding the strip ends together.

6. The process of making continuous metal strip which comprises clamping a length of strip, shearing off the crop end of the strip, aligning a second strip with the first, clamping the second strip, shearing the crop end of the second strip, effecting relative movement between the strips while clamped and welding means to position them for the welding operation, welding the strip ends together, and unclamping the strips.

7. The process of making continuous metal strip which comprises aligning a strip end with another strip end, clamping the strips in the aligned position, shearing off the crop ends of the strips, effecting relative movement between the sheared ends of the strips while clamped and welding means, welding the clamped strips end to end, and then unclamping the strips.

8. The process of making continuous metal strip which comprises aligning a strip end with a shear with the crop end of the strip extending through the shear, clamping the strip in the aligned position, shearing off the crop end of the strip, aligning a second strip with the other side of the shear with the crop end extending through the shear, clamping the second strip, shearing the crop end of the second strip, welding the strip ends together, and then for the first time in the process releasing the clamps.

9. Apparatus for welding metal strip portions end to end comprising means engaging with the sides of the strip portions for aligning the strip portions with each other, means for clamping the strip portions in aligned positions, means for shearing the crop end of each strip portion so that the cuts thereon are identical, means for adjusting the clearance between sheared strip ends, and means for welding the strip ends together without releasing the clamping means.

10. Apparatus for welding metal strip portions end to end comprising means for aligning the strip portions with each other, means for clamping the strip portions in aligned positions, means for shearing the crop end of each strip portion, and means for welding the strip ends together without releasing the clamping means.

11. Apparatus for making continuous strip comprising a shear, means for aligning a strip end with the shear with the crop end extending therethrough, means for clamping the strip in aligned position, means for aligning a second strip with the other side of the shear with the crop end extending therethrough, means for clamping the second strip in aligned position, a welding unit, means for moving the clamping means relative to the shear and welding unit to position the clamped, aligned and sheared ends for welding, means for moving the clamping means toward and from each other to adjust the clearance between the strip ends, and means for coiling the strip after welding.

12. Apparatus for making continuous strip comprising a shear, means for aligning a strip end with the shear with the crop end extending therethrough, means for clamping the strip in aligned position, means for aligning a second strip with the other side of the shear with the crop end extending therethrough, means for clamping the second strip in aligned position, a welding unit, means for effecting relative movement between the clamping means and the shear and welding unit to position the clamped, aligned and sheared ends for welding, and means for moving the clamping means toward and from each other to adjust the clearance between the strip ends.

13. Apparatus for making continuous strip comprising a shear, means for aligning a strip end and the shear with the strip crop end extending therethrough, means for clamping the strip in aligned position, means for aligning a second strip and the other side of the shear with the strip crop end extending therethrough, means for clamping the second strip in aligned position, a welding unit, and means for effecting relative movement between the clamping means and the shear and welding unit to position the clamped, aligned and sheared ends for welding.

14. Apparatus for making continuous strip comprising a shear, means for aligning a strip end with the shear with the crop end extending therethrough, means for clamping the strip in aligned position, means for aligning a second strip with the other side of the shear with the crop end extending therethrough, means for clamping the second strip in aligned position, a welding unit, and means for moving the clamping means laterally relative to the shear and welding unit to position the clamped, aligned and sheared ends for welding.

15. Apparatus for making continuous strip comprising a shear, means for aligning a strip end with the shear with the crop end extending therethrough, means for clamping the strip in aligned position, means for aligning a second strip with the other side of the shear with the crop end extending therethrough, means for clamping the second strip in aligned position, a welding unit, and means for moving the clamping means longitudinally relative to the shear and welding unit to position the clamped, aligned and sheared ends for welding.

16. In apparatus for joining metal strip end to end, the combination of a coil box for receiving the strip, a roll-pass for flattening the strip as it passes from the coil box, a shear for cutting off the crop end of the strip, aligning rollers rotatable about vertical axes positioned between the shear and the roll-pass and adjustable to engage with the sides of the strip to align it with the shear, a vertically reciprocable clamp for releasably holding the strip in aligned position during the crop-shearing operation, a strip-coiling reel positioned in alignment with the other side of the shear, a roll stand positioned between the reel and the shear, aligning rollers rotatable about vertical axes associated with the roll stand and adjustable to engage with the sides of a second strip carried by the reel to align the strip with the shear, a vertically reciprocable clamp for releasably holding the second strip in aligned position during the tail-end crop-shearing operation, and a welder adapted to weld together the abutting ends of the aligned strips, said welder and shear being relatively movable as a unit with respect to the clamped strips whereby the strips may be welded after shearing without unclamping.

17. In apparatus for joining metal strip end to end, the combination of a coil box for receiving the strip, a roll-pass for flattening the strip as received from the coil box, a shear for cutting off the crop end of the strip, a vertically reciprocable clamp for releasably holding the strip in aligned position during the crop-shearing operation, a strip-coiling reel positioned in alignment with the other side of the shear, a roll stand positioned between the reel and the shear, a vertically reciprocable clamp for releasably holding a second strip carried by the reel in aligned position during its crop-shearing operation, and a welder adapted to weld together the abutting ends of the aligned strip.

18. Apparatus for making continuous strip comprising a shear, means for aligning a strip end with the shear with the crop end extending therethrough, means for clamping the strip in aligned position, means for aligning a second strip with the other side of the shear with the crop end extending therethrough, means for clamping the second strip in aligned position, a welding unit aligned laterally with the shear, and means for moving the shear and welding unit laterally to move the shear off of and the welding unit over the clamped, aligned and sheared ends of the strip whereby the welding operation can be performed without unclamping the strips.

19. Apparatus for making continuous strip comprising a shear, means for aligning a strip end with the shear with the drop end extending therethrough, means for clamping the strip in aligned position, means for aligning a second strip with the other side of the shear with the crop end extending therethrough, means for clamping the second strip in aligned position, a welding unit aligned longitudinally with the shear, means securing the clamping means together, and means for moving the clamping means longitudinally while still clamped on the strip to carry the sheared, aligned and abutting ends of the strips from the shear to the welding unit without unclamping whereby the welding operation is facilitated.

20. Apparatus for welding metal strip end to end and comprising means for holding the strip ends in relation for shearing, means for shearing the strip ends so that the ends of the remaining main portions of the strips are in relation for butt welding, and means for moving the shearing and welding means so as to position them in turn over the adjacent edges of the strip to be welded and in operative relation therewith.

21. That method of welding metal strip end to end which comprises aligning the strips with each other, holding the aligned strips, shearing the strip ends so that the ends of the remaining portions of the strip are in relation for butt welding, welding the strip ends together while held in the same position as sheared and without movement of the strip, and then for the first time releasing the strips.

FLORENCE C. BIGGERT, Jr.
CHARLES F. BUENTE.